United States Patent [19]
Hirvonen et al.

[11] Patent Number: 5,592,217
[45] Date of Patent: Jan. 7, 1997

[54] ASSEMBLY FOR COMBUSTION CHAMBER MONITORING CAMERA

[75] Inventors: Juhani Hirvonen, Helsinki; Pekka Kohola, Espoo; Kari Ikonen, Vantaa; Matti Takala, Virkkala, all of Finland

[73] Assignee: Imatran Voima Oy, Helsinki, Finland

[21] Appl. No.: 19,634

[22] Filed: Feb. 18, 1993

[30] Foreign Application Priority Data

Feb. 25, 1992 [FI] Finland ................................ 920826

[51] Int. Cl.$^6$ ............................ H04N 7/18; H04N 5/225
[52] U.S. Cl. ........................... 348/83; 348/207; 348/374; 348/76
[58] Field of Search ................................... 348/66, 72, 76, 348/82, 83, 84, 85, 207, 374, 65, 81; 356/241

[56] References Cited

U.S. PATENT DOCUMENTS

| | | | |
|---|---|---|---|
| 3,021,385 | 2/1962 | Summerhayes | 348/83 |
| 3,021,386 | 2/1962 | Clark | 348/83 |
| 3,114,799 | 12/1963 | Waters et al. | 348/83 |
| 3,588,067 | 6/1971 | Shimotsuma | 348/83 |
| 3,609,236 | 9/1971 | Heilman | 348/83 |
| 4,432,286 | 2/1984 | Witte | 348/83 |
| 4,969,035 | 11/1990 | Dawson | 348/83 |
| 5,068,720 | 11/1991 | Herlitz et al. | 348/82 |

FOREIGN PATENT DOCUMENTS 2127174  4/1984  United Kingdom.

*Primary Examiner*—Joseph Mancuso
*Assistant Examiner*—Bipin Shalwala
*Attorney, Agent, or Firm*—Birch, Stewart, Kolasch & Birch, LLP

[57] ABSTRACT

An assembly for a combustion chamber monitoring camera comprises an image-forming optical system (20) whose object space (26) is a combustion chamber and whose image plane (5) is coincident with the photosensitive element of the camera, and whose focal point (24) on the object space side is situated outside the optical system (20), and a structure (22) enclosing the optical system (20). on the object space side of the optical system (20), a solid baffle plate (38) is placed having a hole (1) made cocentrical with the center axis of the optical system (20) and situated at the focal point (24) of the entire optical system on the object space side, or in the vicinity thereof, and the structure (22, 40) encloses the optical system (20) in such a manner that purging air can be fed via the hole (1) along a channel (32, 34) positioned between the optical system (20) and the enclosing structure (22, 40) thereof in the combustion chamber.

12 Claims, 1 Drawing Sheet

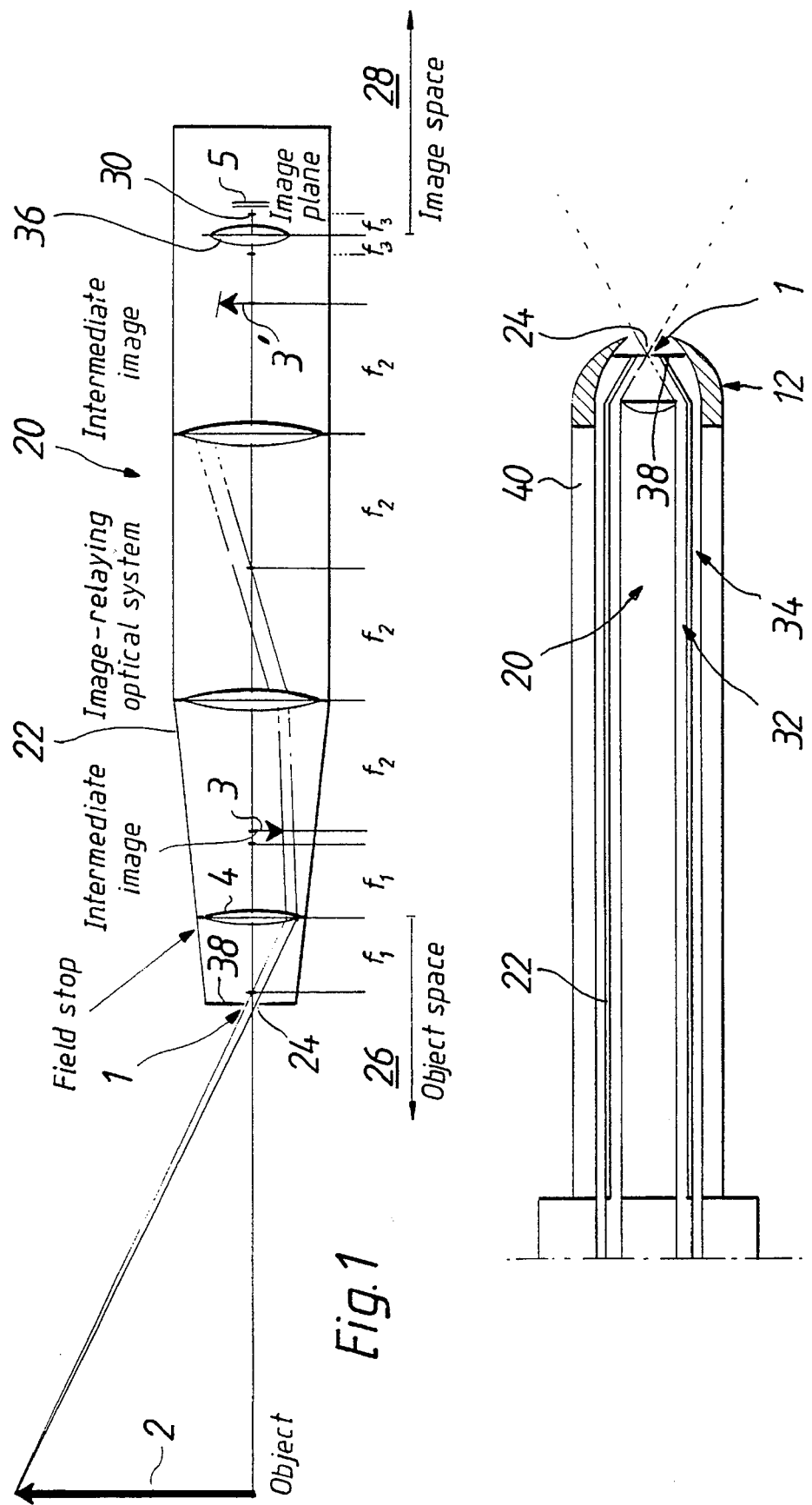

ASSEMBLY FOR COMBUSTION CHAMBER MONITORING CAMERA

FIELD OF THE INVENTION

The present invention concerns an assembly for a combustion chamber monitoring camera.

BACKGROUND OF THE INVENTION

Burner function in combusting process plants is monitored with the help of combustion chamber cameras. The combustion process in the combustion chamber is examined by pushing the tip of the camera's optical assembly into the combustion chamber. Debris accumulation on the front lens of the camera's optical assembly can be a serious drawback limiting the availability of the camera. In difficult conditions the front lens must be cleaned daily.

The GB patent application 2,127,174 describes a periscope-type assembly for monitoring pressurized combustion chambers. The optical system employed is not an arrangement suited to form an image for a camera, but rather, an assembly adapted to relay the image onto the retina of an eye. In such an embodiment the lens system is cooled with an external air flow blown into the chamber via a relatively large opening in the chamber wall in order to prevent lens contamination. In such an arrangement, however, the holes in front of the lenses are inconveniently large and axially misplaced for the desired end result. On one hand the holes are a limiting factor for the field of view and on the other hand, the wide diameter of the hole allows debris to adhere to the lens.

The U.S. patent publication 4,432,286 describes a solution based on the pinhole camera principle for preventing contamination. In such an arrangement the lens assembly is employed for moving the image plane farther away from the combustion chamber. The image plane is situated in the rearmost focal plane of the optical system, so the pinhole performs as the imaging element and the lenses cannot form the image of the object from any distance of the object in the image/imaging plane without presence of the hole. Consequently, the lens optics employed is not an image-forming optical system. The optical resolution of such an arrangement is determined by the diameter of the pinhole. If the image sharpness is desired to be improved the pinhole diameter must be reduced. A smaller diameter of the pinhole leads to a reduced relative aperture. In the embodiment described in the cited publication, the field of view is narrow, approx. 30°.

SUMMARY OF THE INVENTION

It is an object of the present invention to overcome the drawbacks of the above-described technology and to achieve an entirely novel assembly for a combustion chamber monitoring camera.

The invention is based on providing the assembly with a baffle, capable of protecting the optical system from soot and spatter, whereby said baffle is made to have a hole cocentrical with the center axis of the optical system at the focal point of the optical system's object space side and the assembly is complemented with channels for feeding air into the combustion chamber.

More specifically, the method according to the invention is characterized by an assembly for a combustion chamber monitoring camera, said assembly comprising: an image-forming optical system having an object space in a combustion chamber and having an image plane coincident with a photosensitive element of the camera, and having focal point on the object space side situated outside the optical system; a structure enclosing the optical system; a solid baffle plate on the object space side of the optical system having a hole therein, the hole is cocentrical with a center axis of the optical system and is situated at the focal point of the optical system on the object space side, or in the vicinity thereof, the hole being only a light-admission limiting element and thereby failing to determine optical resolution; and a channel in said structure enclosing the optical system for feeding purging air, the channel being formed between the optical system and the enclosing structure and feeding air via said hole into the combustion chamber.

The invention offers significant benefits.

The advantageous location of the baffle hole in the support structure avoids optical disturbance. The air blown through the hole into the combustion chamber prevents soot contamination on the front lens. By virtue of the advantageous location of the baffle hole, its diameter can be varied without limitation. As the hole does not act as an image-forming element, a high quality of the image can be achieved with the help of a dedicated optical system comprised of lenses.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is next examined in greater detail with the help exemplifying embodiments illustrated in the attached drawing, drawings which are given by way of illustration only, and thus are not limitative of the present invention, and in which FIG. 1 shows the optical system of the combustion chamber monitoring camera in a cross-sectional side view.

FIG. 2 shows the mechanical structure of the combustion chamber monitoring camera in a cross-sectional side view.

DETAILED DESCRIPTION OF THE INVENTION

According to FIG. 1 the object space 26 of the combustion chamber monitoring camera begins from the outermost lens 4 and is continued toward the object 2. In addition to the outermost lens, the optical system 20 comprises the image-relaying elements and a rearmost lens 36, behind which the image plane 5 is situated. In the present case the image plane 5 is the photosensitive surface in the camera. The optical system forms intermediate images 3 and 3' from the object. The image space 28 is defined to start from the rearmost lens 36 with continuation toward the image plane. At the end of a support tube 22, to the focal plane of the optical system, a baffle plate 38 is provided that prevents soot and spatter from reaching the front lens 4. To permit admission of light into the optical system, a hole 1 is made in the baffle plate 38 at the focal point 24 of the entire optical system 20. Advantageously, the hole 1 is circular with an advantageous diameter of approx. 1 min. However, the dimensions of the hole I are not critical, because the hole acts at the focal point only as a light-admission limiting element (telecentric aperture stop). Thus, the field of view is not limited even if a small-diameter aperture stop is employed. To make the hole 1 act as an aperture stop, its diameter must be sufficiently small.

According to FIG. 2 the optical system 20 of the combustion chamber monitoring camera comprises an image-relaying optical system which in the present embodiment is a boreoscope. The entire optical system is outlined in this figure only diagrammatically. The optical system 20 is enclosed by a protective tube 22 whose end formed by a baffle plate 38 at the combustion chamber side is adapted to the plane determined by the focal point 24. To the focal plane of the entire optical system, cocentrical with its center axis, that is, to the focal point 24 of the optical system, a hole 1 is arranged which typically acts as an optical aperture stop. Between the optical system 20 and the supporting protective tube 22, channel 32 is positioned via which air is fed toward the combustion chamber. The flow of blown air exits via the hole 1, thereby preventing debris from landing onto the surface of the front lens. The exterior of support tube 22 is complemented with a thermal shield structure 40 carrying a ceramic thermal shield 12 at its end. The ceramic shield 12 performs a particularly advantageous role in this embodiment by virtue of its high thermal resistance, whereby a high surface temperature is achieved and accumulated matter is burnt away from the shield surface. Consequently, the thermal shield 12 attains a certain self-cleaning property. The hole in the ceramic shield 12 must be dimensioned wide enough so as not to restrict the camera's field of view, thus acting as a field-stop. Further, a cooling air flow channel 34 is positioned between the support tube 22 and the frame structure for cooling the entire construction. The cooling air blown toward the combustion chamber.

The embodiment illustrated in FIG. 1 can be modified into an alternative embodiment which has the image plane 5 situated at the intermediate image 3. Then, the photosensitive surface of the camera such as a CCD element is aligned in the plane of the intermediate image 3. In such an embodiment the entire optical system comprises a lens 4, and since the focal point of the lens 4 is situated at a distance of the focal length $f_1$ from the lens, also the hole 1 must be placed coincident with the focal point of the optical system in accordance with the invention.

Although the optimum location of the hole 1 is at the focal point 24 of the entire optical system 20 on the object space side, the location of the hole can be slightly offset by a small tolerance within the immediate vicinity of the focal point 24.

The diameter of the hole 1 can typically be varied in the range 0.2 . . . 2 mm.

Though the hole 1 in the above-described alternative embodiments is made in the baffle plate 38 integral with the support structure 22, the baffle plate 38 can alternatively be fully separated from the support structure 22 and attached to, e.g., thermal shield structure 40. In such a construction the channel 34 can also be employed for feeding air toward the combustion chamber. The essential property according to the invention is related to the location of the hole 1, not to the attaching method of tile baffle plate 38. Neither need the baffle plate 38 be planar; also baffles having convex and concave etc., shapes are equally possible. The embodiment according to the invention requires only the hole 1 of the baffle plate 38 to be located appropriately with respect to the optical system, that is, at the focal point of the entire optical system or in tile immediate vicinity thereof. The baffle plate 38 must be solid to be able to direct the air flow via the hole 1 toward the combustion chamber.

The image-relaying optical system 20 can be replaced by, e.g., an image transmitting optical fiber bundle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An assembly for a combustion chamber monitoring camera, said assembly comprising:

an image-forming optical system having an object space in a combustion chamber and having an image plane coincident with a photosensitive element of the camera, and having a focal point on the object space side situated outside the optical system;

a structure enclosing the optical system;

a solid baffle plate on the object space side of the optical system having a hole therein, the hole is concentrical with a center axis of the optical system and is situated at the focal point of the optical system on the object space side; and a channel in said structure enclosing the optical system for feeding purging air, the channel being formed between the optical system and the enclosing structure and feeding air via said hole into the combustion chamber.

2. The assembly as defined in claim 1, wherein said baffle plate is attached to the support structure of the optical system.

3. The assembly as defined in claim 1, wherein said baffle plate is attached to a thermal shield structure of the optical system.

4. The assembly as defined in claim 1, further comprising a ceramic shield at the combustion chamber end of the structure enclosing the optical system.

5. The assembly as defined in claim 1, wherein said hole has a sufficiently small diameter to permit the hole to act as an aperture stop.

6. The assembly as defined in claim 1, further comprising a second channel in the structure enclosing the optical system, the first channel feeding purging air through the hole in the baffle plate toward the combustion chamber, purging air being fed through the second channel toward the combustion chamber to thereby cool the assembly.

7. The assembly as defined in claim 6, wherein the structure enclosing the optical system includes a protective tube enclosing the optical system and a shield structure enclosing the protective tube, the first channel being between the optical system and the protective tube and the second channel being between the protective tube and the shield structure.

8. The assembly as defined in claim 6, wherein the baffle plate forms an end of the protective tube.

9. The assembly as defined in claim 1, wherein the structure enclosing the optical system includes a protective tube and shield structure, the protective tube enclosing the optical system and the shield structure enclosing the protective tube.

10. The assembly as defined in claim 9, wherein the baffle plate forms an end of the protective tube.

11. The assembly as defined in claim 9, wherein the shield structure has a thermal shield at an end toward the combustion chamber, the thermal shield having a high thermal resistance whereby accumulated matter on an exterior of the thermal shield can be burnt from the shield such that the thermal shield is self-cleaning.

12. The assembly as defined in claim 11, wherein the thermal shield is ceramic.

* * * * *